(12) United States Patent
Futrell et al.

(10) Patent No.: US 10,491,130 B2
(45) Date of Patent: Nov. 26, 2019

(54) MULTI-PURPOSE POWER CONVERSION MODULE

(71) Applicant: HAMILTON SUNDSTRAND CORPORATION, Charlotte, NC (US)

(72) Inventors: Michael Anthony Futrell, Rockford, IL (US); Mustansir Kheraluwala, Lake Zurich, IL (US); Christopher J Courtney, Janesville, WI (US); John Duward Sagona, Poplar Grove, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 56 days.

(21) Appl. No.: 15/850,228

(22) Filed: Dec. 21, 2017

(65) Prior Publication Data

US 2019/0199225 A1     Jun. 27, 2019

(51) Int. Cl.
| | | |
|---|---|---|
| *H02M 3/335* | (2006.01) | |
| *H02M 1/088* | (2006.01) | |
| *H01F 41/10* | (2006.01) | |
| *H01F 27/28* | (2006.01) | |
| *H01F 38/14* | (2006.01) | |
| *H01F 27/24* | (2006.01) | |
| *H01F 29/02* | (2006.01) | |
| *H02P 13/06* | (2006.01) | |
| *H02M 5/12* | (2006.01) | |

(52) U.S. Cl.
CPC ........ *H02M 3/33584* (2013.01); *H01F 27/24* (2013.01); *H01F 27/28* (2013.01); *H01F 29/02* (2013.01); *H01F 38/14* (2013.01); *H01F 41/10* (2013.01); *H02M 1/088* (2013.01); *H02M 3/33576* (2013.01); *H02M 5/12* (2013.01); *H02P 13/06* (2013.01)

(58) Field of Classification Search
CPC ......... H02M 3/33584; H02M 3/33576; H02M 1/088; H01F 27/24; H01F 27/28; H01F 38/14; H01F 41/10
See application file for complete search history.

(56) References Cited

U.S. PATENT DOCUMENTS

| | | |
|---|---|---|
| 3,195,038 A | 7/1965 | Fry |
| 9,520,798 B2 | 12/2016 | Raju et al. |

(Continued)

FOREIGN PATENT DOCUMENTS

| | | |
|---|---|---|
| EP | 0762446 | 3/1997 |
| EP | 1801960 | 6/2007 |
| FR | 1011150 | 6/1952 |

OTHER PUBLICATIONS

European Patent Office, European Search Report dated May 22, 2019 in Application No. 18214159.8.

*Primary Examiner* — Adolf D Berhane
*Assistant Examiner* — Kevin H Sprenger
(74) *Attorney, Agent, or Firm* — Snell & Wilmer, L.L.P.

(57) ABSTRACT

A power converter may comprise a magnetic core, a transformer primary winding configured to generate a magnetic field in the magnetic core, and a transformer secondary winding matrix. The transformer secondary winding matrix may comprise a plurality of secondary windings configurable between various electrical connections relative to one another (e.g., in series or in parallel) to adjust a voltage conversion ratio of the power converter.

16 Claims, 7 Drawing Sheets

(56) References Cited

U.S. PATENT DOCUMENTS

| | | |
|---|---|---|
| 9,774,241 B2 | 9/2017 | Sato et al. |
| 2005/0006367 A1* | 1/2005 | Dodge ................ B23K 9/1006 |
| | | 219/130.1 |
| 2010/0182814 A1* | 7/2010 | Tada .................... H02J 7/0054 |
| | | 363/134 |
| 2014/0091149 A1* | 4/2014 | Finn ................ G06K 19/07769 |
| | | 235/492 |
| 2016/0036323 A1 | 2/2016 | She et al. |
| 2017/0237355 A1 | 8/2017 | Stieneker et al. |
| 2017/0287615 A1* | 10/2017 | Lu ............................ H01F 1/34 |

\* cited by examiner

MULTI-PURPOSE POWER CONVERSION MODULE

FIELD

The disclosure generally relates to power converters, and more particularly to voltage transformers for uni-directional and/or bi-directional DC/DC power converters.

BACKGROUND

Switch mode DC-DC converters are widely used for converting a given input electrical power to a desired output electrical power, with such DC-DC converters being able to function as boost-type converters (converting an input voltage to a higher output voltage), buck-type converters (converting an input voltage to a lower output voltage), or converters capable of both boosting or bucking the voltage. In addition, they can be classified as unidirectional or bi-directional converters based on their ability to flow power. In switch mode DC-DC converters, the input power is provided from a source to the converter through input terminals on an input side, converted by the converter into the desired output power and then output through output terminals on an output side provided to a load. The converter comprises a switching arrangement and power transformer for transferring the electrical power from the input side to the output side and for modulating the input electrical power before it is provided to the output terminals. The switches employed in such switching arrangements are typically comprised of solid state switches, such as MOSFET transistors for example. The transformer provides for galvanic isolation between the input and output and voltage step-up or step-down.

Space modules, or habitats and vehicles in space, may demand more modular operation and may demand reduced spares due to environment and distance between habitats. Power Systems on space modules are typically hybrid systems, utilizing solar panels and batteries for example. Space modules may include systems for converting solar array unregulated power to main battery bus regulated power; for converting battery to main bus bi-directional charge and discharge; and for converting regulated power from a main bus voltage to various other voltages suitable for various electronic devices. Typically, these modules are separate, utilizing separate non-recurring development and qualification costs. In addition, when installed on a space module, there may be a demand for spares for each type of module.

SUMMARY

A power converter is disclosed herein, comprising a transformer primary winding and a transformer secondary winding and switching matrix, comprising a plurality of secondary windings (n), and a plurality of switches (n−1)*3, wherein the plurality of switches are configurable to vary a voltage ratio of the power converter.

In various embodiments, the voltage ratio comprises a ratio of a transformer primary winding voltage and a transformer secondary winding and switching matrix voltage.

In various embodiments, the plurality of switches each comprises at least one of a solid state device or a relay.

In various embodiments, the plurality of secondary windings comprises a first winding, a second winding, a third winding, and a fourth winding.

In various embodiments, the first winding is coupled to a positive output terminal, the second winding is coupled to the positive output terminal via a first switch, the third winding is coupled to the positive output terminal via the first switch and a second switch, and the fourth winding is coupled to the positive output terminal via the first switch, the second switch, and a third switch.

In various embodiments, the power converter further comprises a fourth switch coupled across the first switch and the first winding, a fifth switch coupled across the second switch and the second winding, and a sixth switch coupled across the third switch and the third winding.

In various embodiments, the power converter further comprises a seventh switch coupled between the first winding and a negative output terminal of the transformer secondary winding and switching matrix, an eighth switch coupled between the second winding and the negative output terminal of the transformer secondary winding and switching matrix, and a ninth switch coupled between the third winding the negative output terminal of the transformer secondary winding and switching matrix.

In various embodiments, the power converter further comprises a controller, wherein the controller is configured to control the switches, the switches configurable between an open position and a closed position.

In various embodiments, the first winding is coupled to a positive output terminal and the second winding is coupled to a negative output terminal, the first winding is coupled to the second winding in at least one of parallel or series, and an output voltage of the transformer secondary winding and switching matrix is a voltage difference between the positive output terminal and the negative output terminal.

A power converter is disclosed, comprising a magnetic core, a transformer primary winding configured to generate a magnetic field in the magnetic core, and a transformer secondary winding matrix, comprising a first winding having a first number of turns, and a second winding having a second number of turns, wherein the first winding and the second winding are configured to transform the magnetic field in the magnetic core into an electric power, and wherein the first winding comprises a first surface contact and a second surface contact, and the second winding comprises a third surface contact and a fourth surface contact.

In various embodiments, the power converter is configured to comprise a first voltage ratio in response to the first winding being connected in series with the second winding, via the first surface contact, second surface contact, third surface contact, and fourth surface contact, and wherein the power converter is configured to comprise a second voltage ratio in response to the first winding being connected in parallel with the second winding, via the first surface contact, second surface contact, third surface contact, and fourth surface contact.

In various embodiments, the first voltage ratio is less than the second voltage ratio.

In various embodiments, the power converter further comprises a plurality of connectors configured to connect to the first surface contact, second surface contact, third surface contact, and fourth surface contact, wherein the power converter is configurable between the first voltage ratio and the second voltage ratio in response to the plurality of connectors being connected to the transformer secondary winding matrix.

In various embodiments, the first winding is connected in at least one of series or parallel with the second winding, via the first surface contact, second surface contact, third surface contact, fourth surface contact, and the plurality of connectors.

In various embodiments, the first surface contact, the second surface contact, the third surface contact, and the fourth surface contact are disposed on a board edge connector.

In various embodiments, the power converter further comprises a configuration card configured to connect to the board edge connector, wherein a voltage ratio of the power converter is configured in response to the configuration card being connected to the board edge connector.

In various embodiments, the configuration card comprises a plurality of connectors disposed on the configuration card, wherein the plurality of connectors contact at least one of the first surface contact, the second surface contact, the third surface contact, or the fourth surface contact in response to the configuration card being connected to the board edge connector.

A method for configuring a voltage conversion ratio of a transformer is disclosed, comprising connecting a first connector to a first winding of a transformer secondary winding matrix, connecting a second connector to a second winding of the transformer secondary winding matrix, wherein the first winding and the second winding surround a magnetic core, and wherein the first connector is configured to receive an electric current from the first winding.

In various embodiments, the first connector is connected to the first winding in response to a configuration card being connected to a board edge connection of the transformer, wherein the first connector is disposed on the configuration card, and the second connector is connected to the second winding in response to the configuration card being connected to the board edge connection of the transformer, wherein the second connector is disposed on the configuration card.

In various embodiments, the first connector is soldered onto a first surface contact of the first winding and the second connector is soldered onto a second surface contact of the second winding.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
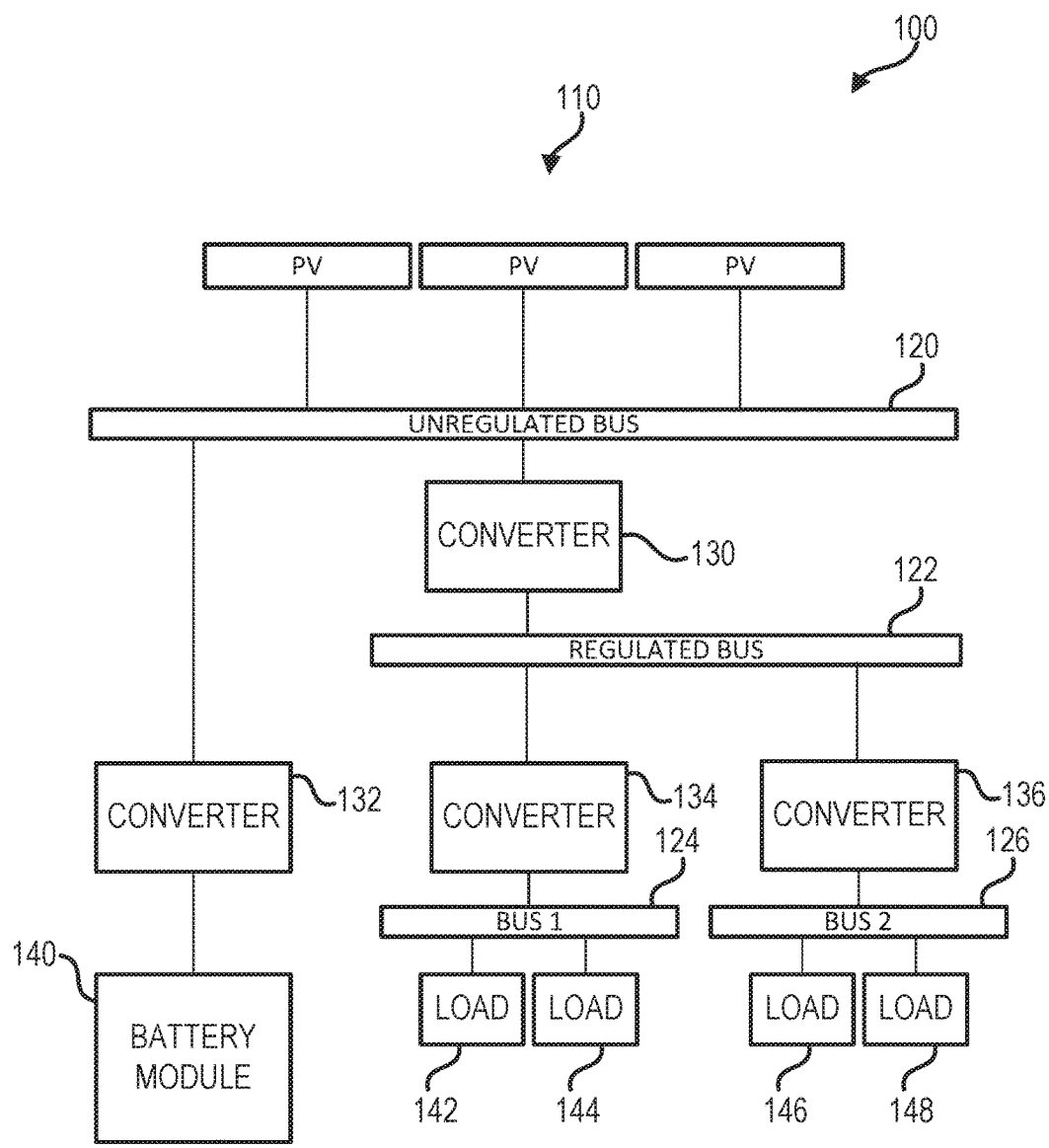
FIG. 1 illustrates a schematic view of a power electronics arrangement having power converters of various voltage conversion ratios, in accordance with various embodiments.

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). In that regard, use of the term "electronic communication" includes both "electrical communication" and "inductive communication."

Space modules, or habitats and vehicles in space, may demand more modular operation and may demand reduced spares due to environment and distance between habitats. Power systems on space modules are typically hybrid systems, utilizing solar panels and batteries for example. Space modules may include systems for converting solar array unregulated power to main battery bus regulated power; for converting battery to main bus bi-directional charge and discharge; and for converting regulated power from a main bus voltage to various other voltages suitable for various electronic devices. Typically, these modules are separate, utilizing separate non-recurring development and qualification costs. In addition, when installed on a space module, there may be a demand for spares for each type of module.

In various embodiments, the present disclosure provides an electronics module for combining otherwise typically separate power conversion modules into a singular module. This may be done by replacing the transformer in a dual active bridge DC-DC converter (or other converter with transformer isolation) with a power transformer comprising a single transformer primary winding, and a transformer secondary winding matrix to allow for various transformer ratios. Switches within the transformer secondary winding matrix may be controlled by a module controller. For example, the solar array to main bus converter may be a 1:1 configuration (120 VDC unregulated to 120 VDC regulated), the 1:4 configuration may be for main bus to 28 VDC bus conversion (120 VDC to 30 VDC), and the 1:2 configuration may be for an intermediate bus (120 VDC to 48 VDC). The controller may either be external communications programmable or module slot connector programmable to configure the transformer secondary winding matrix. The controller may have all suitable software to operate each of the module configurations. In this regard, when the multi-purpose module is placed into a slot, it may automatically reconfigure to perform the function of that slot. For example, when the module is placed into a battery charge/discharge slot, it may automatically reconfigure to perform that function. When placed in a solar power to main bus slot, it may automatically reconfigure to perform that function. When placed in a 28 VDC slot, it may automatically reconfigure to provide that function. The present disclosure may be applicable to any uni-directional or bi-directional DC-DC converter utilizing a transformer for isolation between the converter input and output.

With reference to FIG. 1, a power electronics arrangement (also referred to herein as an arrangement) 100 is illustrated, in accordance with various embodiments. In various embodiments, arrangement 100 may comprise a power system for a space module. However, arrangement 100 may comprise a power system for any suitable system. Arrangement 100 may include a photovoltaic (PV) array (commonly referred to as a solar array) 110, an unregulated bus 120, a converter 130, a regulated bus 122, a converter 132, and a battery module 140. PV array 110 may generate DC electric power which is sent to unregulated bus 120. Converter 132 may convert unregulated electric power received from unregulated bus 120 to a regulated DC electric power comprising a voltage suitable for battery module 140. In this regard, battery module 140 may receive electric power from converter 132. Converter 132 may comprise a bi-direction DC/DC converter. In this regard, battery module 140 may receive and store electric power from unregulated bus 120 and battery module 140 may send electric power to unregulated bus 120, via converter 132. In various embodiments, battery module 140 may comprise one or more batteries and/or capacitors.

In various embodiments, converter 130 may convert the unregulated electric power received from unregulated bus 120, into a regulated DC electric power received by regulated bus 122. Stated differently, regulated bus 122 may receive the regulated DC electric power from converter 130. In various embodiments, the voltage of unregulated bus 120 may vary, for example between one hundred and thirty and two hundred volts (130-200 VDC), depending on the power received by PV array 110 and/or battery module 140. In various embodiments, the voltage of regulated bus 122 may be regulated at a constant voltage, such as one hundred volts (100 VDC) for example. DC electric power may be distributed to various electronic devices.

In various embodiments, arrangement 100 may further include a converter 134 and a DC bus 124. Converter 134 may be connected in series between regulated bus 122 and DC bus 124. Converter 134 may receive electric power from regulated bus 122 and convert the electric power to a voltage suitable for DC bus 124. For example, converter 134 may convert the regulated electric power of regulated bus 122 from the regulated bus voltage, such as one hundred volts (100 VDC) for example, to a voltage suitable for DC bus 124, such as forty-eight volts (48 VDC) for example.

In various embodiments, arrangement 100 may further include a converter 136, and a DC bus 126. Converter 136 may be connected in series between regulated bus 122 and DC bus 126. In various embodiments, Converter 136 may receive electric power from regulated bus 122 and convert the electric power to a voltage suitable for DC bus 126. For example, converter 136 may convert the regulated electric power of regulated bus 122 from the regulated bus voltage, such as one hundred volts (100 VDC) for example, to a voltage suitable for DC bus 126, such as twenty-eight volts (28 VDC) for example.

Figure 2:
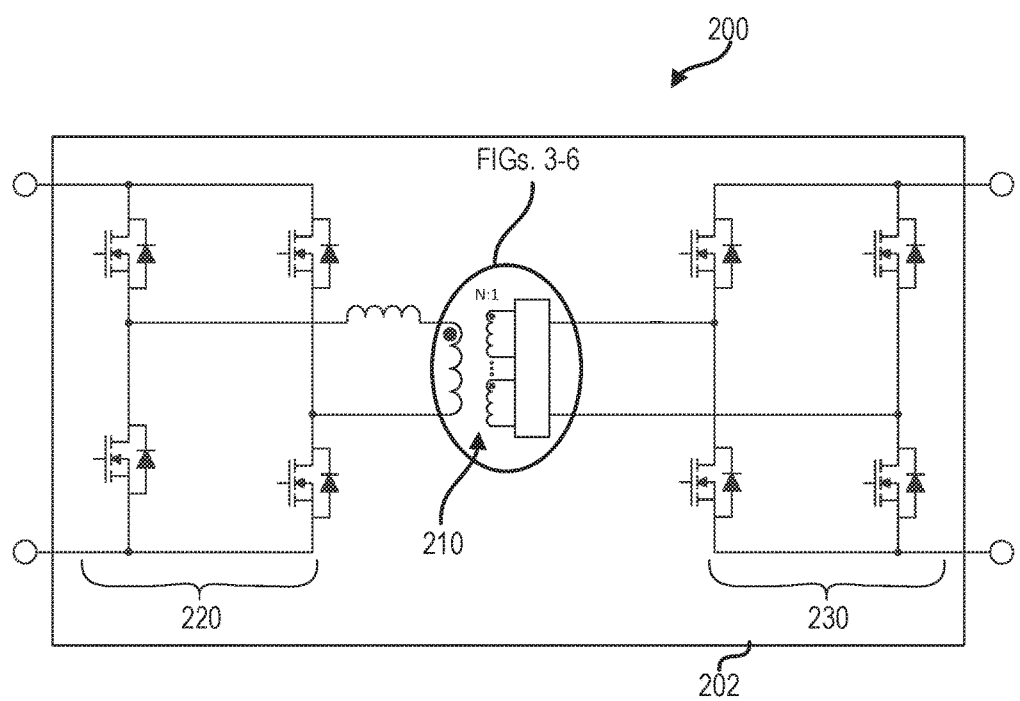
FIG. 2 illustrates a schematic view of a power converter having a transformer and a switching matrix, in accordance with various embodiments.

With reference to FIG. 2, converter 200 is illustrated, in accordance with various embodiments. Converter 200 may be similar to converter 130, converter 132, converter 134, and/or converter 136, with momentary reference to FIG. 1. Converter 200 may comprise a dual active bridge DC-DC converter. Converter 200 may include a transformer 210 coupled between a first bridge 220 and a second bridge 230. In various embodiments, first bridge 220 may comprise a full bridge topology, as illustrated in FIG. 1. However, it is contemplated herein that first bridge 220 may comprise any suitable bridge topology, such as a half-bridge topology for example. Second bridge 230 may comprise a full bridge topology, as illustrated in FIG. 1. However, it is contemplated herein that second bridge 230 may comprise any suitable bridge topology. Transformer 210 may comprise a transformer primary winding and a plurality of transformer secondary windings (also referred to herein as a transformer secondary winding matrix), as will be discussed with further detail herein. Converter 200 may convert electric power from a first voltage, for example a high voltage of 270V, to a second voltage, for example a low voltage of 28V.

In various embodiments, converter 200, including transformer 210, first bridge 220, and second bridge 230, may be disposed on a circuit board 202. Circuit board 202 may be configured to be attached at various locations of a power electronics arrangement. In this regard, converter 200 may be suitable for connection to a power electronics arrangement at various locations having various power conversion ratios in a non-cumbersome manner. In this regard, converter 200 may be reconfigurable.

Figure 3:
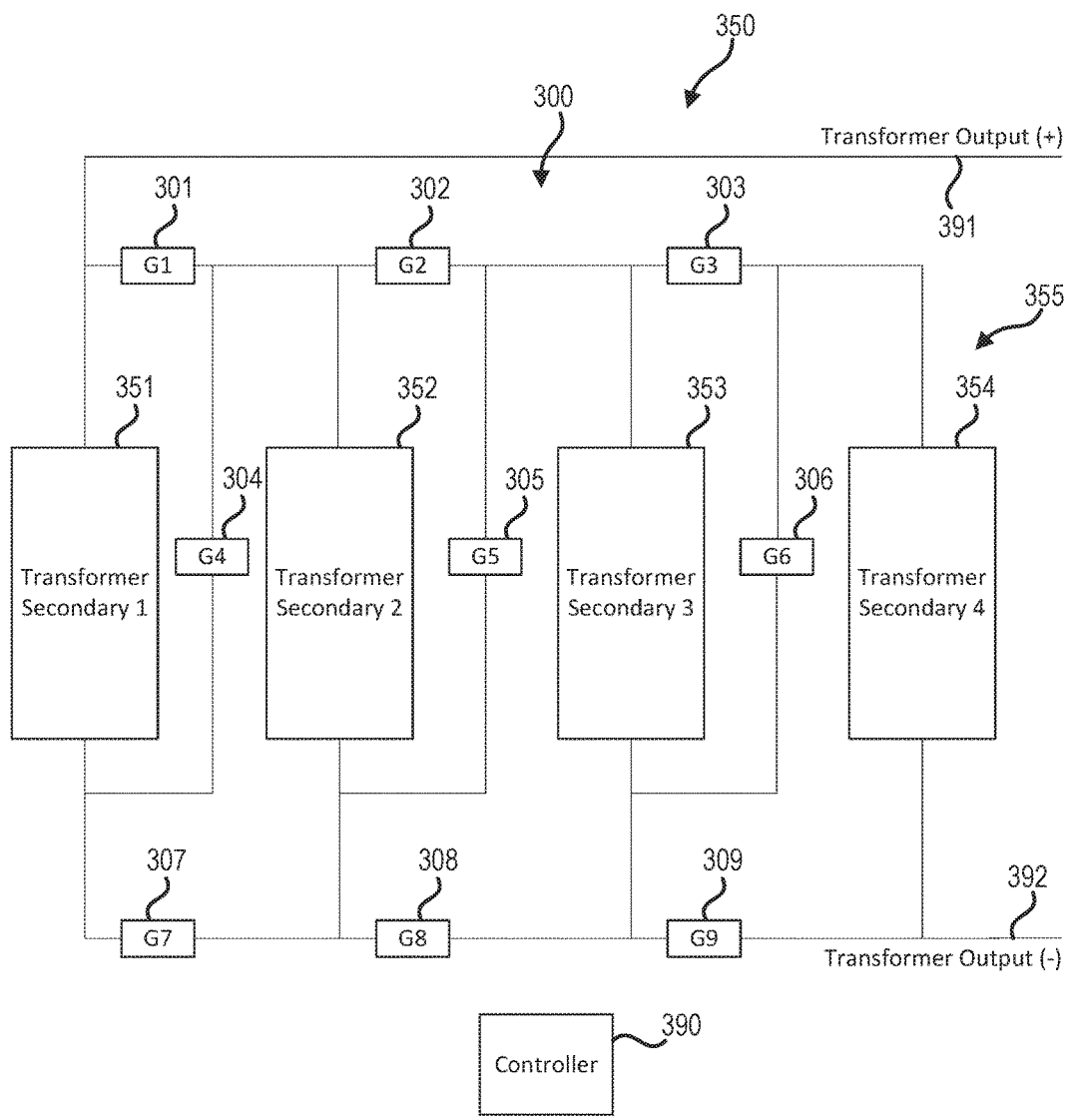
FIG. 3 illustrates a schematic view of a transformer secondary winding and switching matrix for a transformer, in accordance with various embodiments.

With reference to FIG. 3, a schematic view of a transformer secondary winding and switching matrix (also referred to herein as a secondary winding matrix) 350 is illustrated, in accordance with various embodiments. Secondary winding matrix 350 may comprise a plurality of secondary windings 355. Secondary winding matrix 350 is described herein with respect to four secondary windings suitable for configuring transformer ratios of (1:1), (2:1), and (4:1). However, it should be understood that secondary winding matrix 350 may include any number of windings (n). The number of windings (n) may be chosen depending on a maximum desirable voltage conversion ratio (n:1) for the converter.

In various embodiments, plurality of secondary windings 355 may include a first secondary winding (first winding) 351, a second secondary winding (second winding) 352, a third secondary winding (third winding) 353, and a fourth secondary winding (fourth winding) 354. Each winding of the plurality of secondary windings 355 may be configurable between various electrical connections relative to each other (e.g., parallel or series with respect to one another) via a plurality of switches 300.

In various embodiments, secondary winding matrix 350 may include plurality of switches 300. Plurality of switches 300 may include a first switch 301, a second switch 302, a third switch 303, a fourth switch 304, a fifth switch 305, a sixth switch 306, a seventh switch 307, an eighth switch 308, and a ninth switch 309.

In various embodiments, first winding 351 may be coupled to a positive output terminal 391 of secondary winding matrix 350. Second winding 352 may be coupled to positive output terminal 391, via first switch 301. Stated differently, first switch 301 may be coupled between positive output terminal 391 and second winding 352. Third winding 353 may be coupled to positive output terminal 391 via first switch 301 and second switch 302. Fourth winding 354 may be coupled to positive output terminal 391 via first switch 301, second switch 302, and third switch 303. Fourth switch may be coupled across first switch 301 and first winding 351. Fifth switch may be coupled across second switch 302 and second winding 352. Sixth switch 306 may be coupled across third switch 303 and third winding 353. Seventh switch 307 may be coupled between first winding 351 and negative output terminal 392 of secondary winding matrix 350. Eighth switch 308 may be coupled between second winding 352 and negative output terminal 392. Ninth switch 309 may be coupled between third winding 353 and negative output terminal 392. In various embodiments, the output voltage of secondary winding matrix 350 may be the voltage difference between positive output terminal 391 and negative output terminal 392.

It should be understood that, although described herein with respect to nine switches 300, the number of switches in secondary winding matrix 350 may change depending on the number of secondary windings 355. For example, if there are only two secondary windings 355, then there may only be three switches 300 (e.g., switch 301, switch 304, and switch 307). In this regard, a secondary switch matrix having (n) secondary windings may include (n−1)*3 switches.

In various embodiments, plurality of switches 300 may be controlled by a controller 390. Stated differently, each of the plurality of switches 300 may be actuated between a closed position and an open position in response to a control signal received by controller 390. In this regard, plurality of switches 300 may be in electronic communication with controller 390 via a conductive member such as a metal wire, a thin metal strip, a metal bar, or any other conductive member suitable for powering plurality of switches 300. In various embodiments, each switch of the plurality of switches 300 may comprise a solid state device, such as a field effect transistors (FET) for example. In various embodiments, each switch of the plurality of switches 300 may comprise a GAN device for its low resistance characteristics to maintain high converter efficiency. In various embodiments, each switch of the plurality of switches 300 may comprise a relay. Controller 390 may comprise a processor, a microprocessor, a field programmable gate array (FPGA), or the like. Controller 390 may comprise a tangible, non-transitory memory configured to communicate with controller 390. In this regard, plurality of switches 300 may be in electronic communication with controller 390.

Controller 390 may be configured to control the plurality of switches 300 of each secondary winding matrix 350 based upon the location of the secondary winding matrix. For example, with combined reference to FIG. 1 and FIG. 3, converter 132 may comprise plurality of switches 300. Controller 390 may be configured to control plurality of switches 300 such that converter 132 comprises a voltage ratio such that the voltage of the power being supplied is suitable for battery module 140. Similarly, converter 130 may comprise plurality of switches 300. Controller 390 may be configured to control plurality of switches 300 such that converter 130 comprises a voltage ratio such that the voltage of the power being supplied is suitable for regulated bus 122. Controller 390 may similarly control switches corresponding to converter 134 and/or converter 136. In this regard, similar converters may be used for converters having varying voltage ratios (e.g., converter 130, converter 132, converter 134, and/or converter 136), wherein the voltage ratio of the converter is configured based upon the location of the converter is connected to arrangement 100. In this regard, a converter having a secondary winding matrix 350 may be connected between unregulated bus 120 and regulated bus 122, similar to converter 130, wherein the switches of the converter are configured to be open and/or closed such that the converter comprises a first pre-determined voltage ratio. The same converter may be disconnected from between unregulated bus 120 and regulated bus 122, and then connected between unregulated bus 120 and battery module 140, similar to converter 132, and in response to connecting the converter between unregulated bus 120 and battery module 140, the switches of the converter may be configured such that the converter comprises a second pre-determined voltage ratio.

Figure 4:
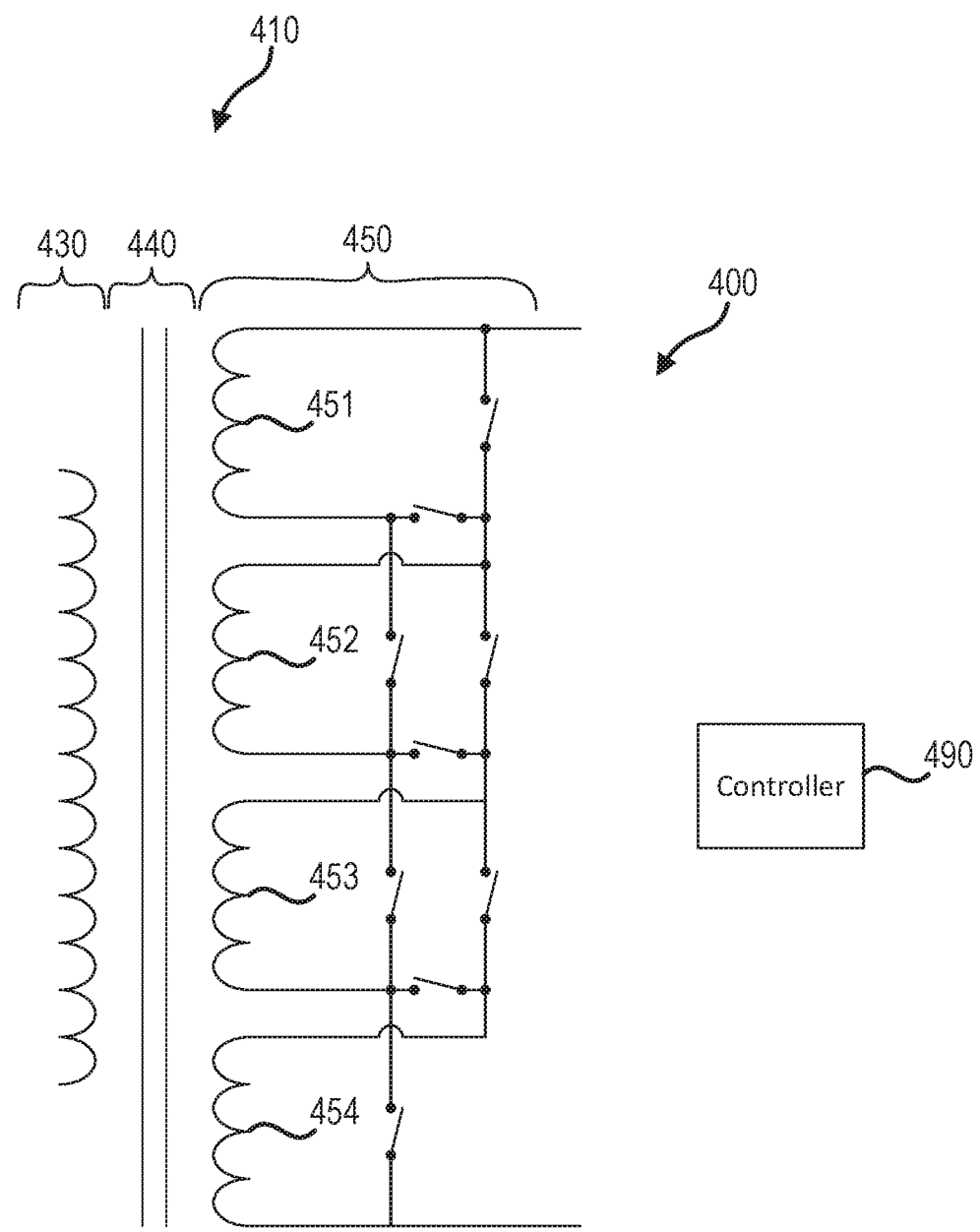
FIG. 4 illustrates a schematic view of a transformer secondary winding and switching matrix having a plurality of switches for configuring a voltage ratio of a transformer, in accordance with various embodiments.

With reference to FIG. 4, a schematic view of a transformer 410 including a transformer secondary winding and switching matrix (also referred to herein as a secondary winding matrix) 450 is illustrated, in accordance with various embodiments. Secondary winding matrix 350 may be similar to secondary winding matrix 450, with momentary reference to FIG. 3. Transformer 410 may include a transformer primary winding 430, a magnetic core 440, and secondary winding matrix 450. Transformer primary winding 430 may be configured to generate a magnetic field in magnetic core 440. Secondary winding matrix 450 may be configured to transform the magnetic field in magnetic core 440 into an electric power (i.e., a current and a voltage). Transformer primary winding 330 may comprise a number of turns. As used herein, the number of turns of a winding may refer to the number of revolutions the winding is wrapped around magnetic core 440. In this regard, transformer primary winding 330 may surround magnetic core 440. Secondary winding matrix 450 may include a first winding 451, a second winding 452, a third winding 453, and a fourth winding 454. First winding 451 may include a number of turns (also referred to herein as a first number of turns). Second winding 452 may include a number of turns (also referred to herein as a second number of turns). Third winding 453 may include a number of turns (also referred to herein as a third number of turns). Fourth winding 454 may include a number of turns (also referred to herein as a fourth number of turns). First winding 451, second winding 452, third winding 453, and fourth winding 454 may surround magnetic core 440. In this regard, transformer primary winding 430, first winding 451, second winding 452, third winding 453, and fourth winding 454 may be wrapped around a common magnetic member. In various embodiments, first winding 451, second winding 452, third winding 453, and fourth winding 454 may each include the same number of turns.

In various embodiments, secondary winding matrix 450 may include a plurality of switches 400. Plurality of switches 300 may be similar to plurality of switches 400, with momentary reference to FIG. 3.

In various embodiments, a controller 490 may be in electronic communication with plurality of switches 400. Controller 390 may be similar to controller 490, with momentary reference to FIG. 3. Controller 490 may be in electronic communication with plurality of switches 400 via any suitable means, including but not limited to a hard-wired connection or a wireless connection.

In various embodiments, secondary winding matrix 450, plurality of switches 400, and controller 490 may be located on the same circuit board (e.g., circuit board 202).

In various embodiments, controller 490 may be configured to configure plurality of switches 400 in response to a location of transformer 410 within a power electronics arrangement (e.g., arrangement 100 of FIG. 1). With combined reference to FIG. 1 and FIG. 4, controller 490 may be receive a first configuration signal (e.g., from a separate controller) corresponding to a first voltage ratio in response to transformer 410 being connected between unregulated bus 120 and regulated bus 122. Similarly, controller 490 may be receive a second configuration signal (e.g., from the separate controller) corresponding to a second voltage ratio in response to transformer 410 being connected between unregulated bus 120 and battery module 140. Thus, the same power converter may be used in various locations of a power electronics arrangement and may automatically configure to perform the appropriate voltage conversion in response to receiving a configuration signal.

The term "voltage ratio" as used herein, may refer to the ratio of the transformer primary winding voltage (the voltage across transformer primary winding 430) and the secondary winding matrix voltage (the voltage across secondary winding matrix 450).

Instead of being automatically configured, the secondary winding matrix may be manually configured, as described with reference to FIG. 5A, FIG. 5B, and FIG. 5C.

Figure 5C:
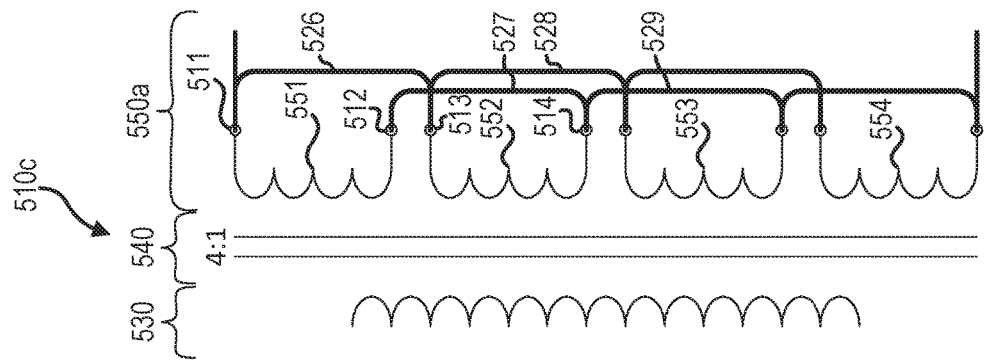
FIG. 5A, FIG. 5B, and FIG. 5C illustrate schematic views of a secondary winding matrix having connectors coupled to surface contacts of the secondary winding matrix, in accordance with various embodiments.
Figure 5B:
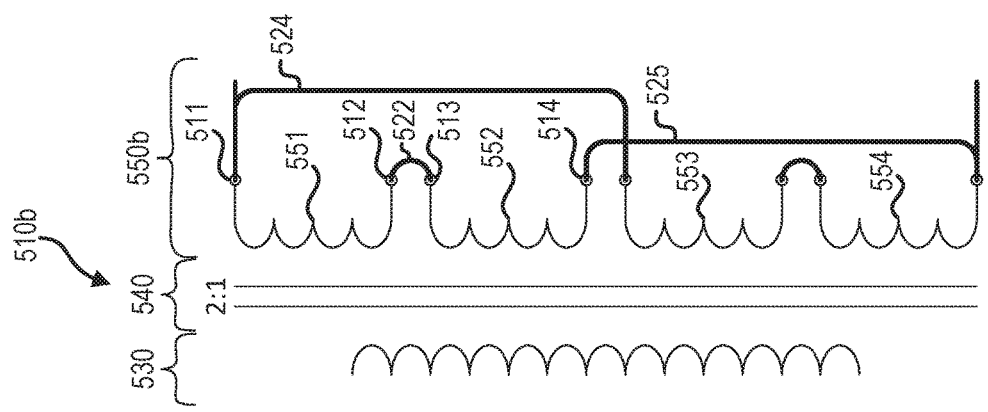
Figure 5A:
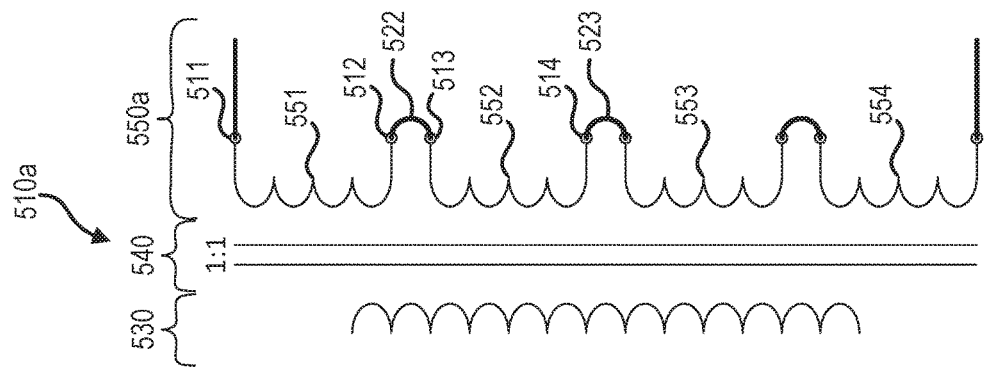

With respect to FIG. 5B and FIG. 5C, elements with like element numbering, as depicted in FIG. 5A, are intended to be the same and will not necessarily be repeated for the sake of clarity.

With reference to FIG. 5A, a transformer 510a is illustrated, in accordance with various embodiments. Transformer 510a includes transformer primary winding 530, magnetic member 540, and secondary winding matrix 550a. Transformer 510a is illustrated with secondary winding matrix 550a having a first winding 551, a second winding 552, a third winding 553, and a fourth winding 554 connected in series. In this configuration, transformer 510a may comprise a 1:1 voltage ratio.

With reference to FIG. 5B, a transformer 510b is illustrated, in accordance with various embodiments. Transformer 510b may include transformer primary winding 530, magnetic member 540, and secondary winding matrix 550b. Transformer 510b is illustrated with secondary winding matrix 550b having first winding 551 and second winding 552 connected in series, third winding 553 and fourth winding 554 connected in series, and first winding 551 and second winding 552 connected in parallel with third winding 553 and fourth winding 554. In this configuration, transformer 510b may comprise a 2:1 voltage ratio.

With reference to FIG. 5C, a transformer 510c is illustrated, in accordance with various embodiments. Transformer 510c may include transformer primary winding 530, magnetic member 540, and secondary winding matrix 550c. Transformer 510c is illustrated with secondary winding matrix 550c having first winding 551, second winding 552, third winding 553, and fourth winding 554 connected in parallel. In this configuration, transformer 510c may comprise a 4:1 voltage ratio.

With combined reference to FIG. 5A, FIG. 5B, and FIG. 5C, first winding 551 may include a first surface contact 511 and a second surface contact 512. Second winding 552 may include a third surface contact 513 and a fourth surface contact 514. As used herein, the term "surface contact" may refer to a conductive surface of a winding configured for connecting to another conductive material. In various embodiments, third winding 553 and fourth winding 554 may comprise surface contacts, similar to first winding 551 and second winding 552.

With reference to FIG. 5A, first winding 551 may be connected in series with second winding 552 via first surface contact 511, second surface contact 512, third surface contact 513, and fourth surface contact 514. The surface contacts may be electrically connected via a plurality of connectors. Second surface contact 512 may be electrically connected to third surface contact 513 via a connector 522. In various embodiments, connector 522 may comprise a shorting member which is capable of electrically connecting or "shorting" two or more surface contacts within a secondary winding matrix. In various embodiments, connector 522 comprises a wire. In various embodiments, connector 522 comprises a metallic strip or bar. In various embodiments, connector 522 may be connected to second surface contact 512 via a soldering process. However, connector 522 may be connected to second surface contact 512 via any suitable connection. Fourth surface contact 514 may be electrically connected to an adjacent winding (i.e., winding 553) via a connector 523.

With reference to FIG. 5B, first surface contact 511 may be electrically connected to third winding 553 via a connector 524. Fourth surface contact 514 may be electrically connected to fourth winding 554 via a connector 525.

With reference to FIG. 5C, first surface contact 511 may be electrically connected to third surface contact 513 via a connector 526. Second surface contact 512 may be electrically connected to fourth surface contact 514 via a connector 527. Third surface contact 513 may be electrically connected to fourth surface contact 514 via a connector 528. Fourth surface contact 514 may be electrically connected to third winding 553 via a connector 529.

The connectors may be configured to carry an electric current from the windings to an output of the transformer. For example, electric current may flow between first winding 551 and second winding 552, via connector 522.

In various embodiments, the surface contacts (e.g., surface contact 511, surface contact 512, etc.) may be soldered or printed onto a circuit board (e.g., circuit board 202) to allow for connector (e.g., connector 522, connector 523, etc.) to be soldered to allow for different secondary winding configurations for various voltage conversion ratios. In this regard, a common single-board design may be used for various input/output voltage applications.

As should be obvious to a person having ordinary skill in the art, various voltage ratios may be achieved depending on the relative connections of each of the secondary windings and the number of turns in the transformer primary winding and each of the secondary windings. However, having a common number of turns for each of the windings of the power converter may allow for reduced part count, and interchangeable power converters, reducing the number of spare parts desirable for power electronics arrangement, for example for a space module.

Figure 6:
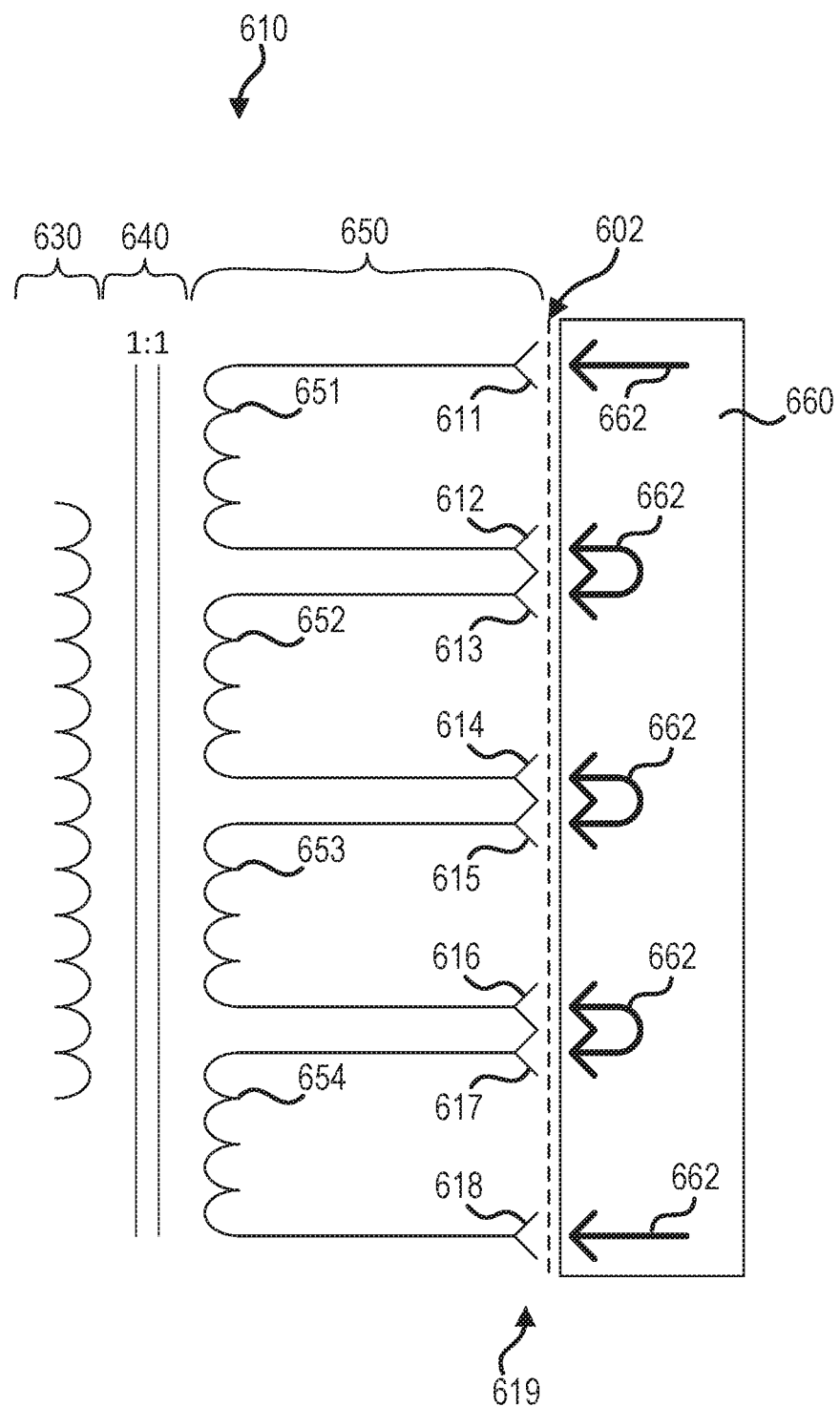
FIG. 6 illustrates a schematic view of a configuration card configured to connect to a board edge connector of a secondary winding matrix for configuring the voltage ratio of a transformer, in accordance with various embodiments.

With reference to FIG. 6, a transformer 610 having a board edge connector 602 for receiving an external configuration card 660 is illustrated, in accordance with various embodiments. Transformer 610 may include a transformer primary winding 630, a magnetic member 640, and a secondary winding matrix 650. Secondary winding matrix 650 may include a first winding 651, a second winding 652, a third winding 653, and a fourth winding 654. First winding 651 may include a surface contact 611 and a surface contact 612. Surface contact 611 and surface contact 612 may be located on opposite ends of first winding 651. Second winding 652 may include a surface contact 613 and a surface contact 614. Surface contact 613 and surface contact 614 may be located on opposite ends of second winding 652. Third winding 653 may include a surface contact 615 and a surface contact 616. Surface contact 615 and surface contact 616 may be located on opposite ends of third winding 653. Fourth winding 654 may include a surface contact 617 and a surface contact 618. Surface contact 617 and surface contact 618 may be located on opposite ends of fourth winding 654. Surface contact 611, surface contact 612, surface contact 613, surface contact 614, surface contact 615, surface contact 616, surface contact 617, and surface contact 618 may be collectively referred to herein as a plurality of surface contacts 619.

In various embodiments, plurality of surface contacts 619 may be disposed along board edge connector 602. Board edge connector 602 may be configured to receive configuration card 660. Configuration card 660 and board edge connector 602 may be connected using board to backplane connectors. Configuration card 660 may comprise a plurality of connectors 662 configured to electrically connect to secondary winding matrix 650, via plurality of surface contacts 619. In this regard, connectors 662 may correspond to one or more surface contacts (e.g., surface contact 612). In this regard, connectors 662 may contact plurality of surface contacts 619 in response to configuration card 660 being connected to board edge connector 602. Connectors 662 may comprise metal wires, metal strips, metal bars, or the like. In various embodiments, connectors 662 may be printed onto configuration card 660. In various embodiments, connectors 662 may be soldered onto configuration card 660. In the illustrated embodiment, configuration card 660 is configured to connect first winding 651, second winding 652, third winding 653, and fourth winding 654 in series. However, the connectors 662 of configuration card 660 may be configured to connect the windings of secondary winding matrix 650 in various configurations to change the voltage conversion ratio of transformer 610. Connectors 662 of configuration card 660 may comprises topologies similar to the connectors of FIG. 5A, FIG. 5B, FIG. 5C, or various other topologies depending on the number of secondary windings and the desired voltage conversion ratio. However, unlike the connectors of FIG. 5A, FIG. 5B, and FIG. 5C, connectors 662 may be installed and/or removed as a single part (i.e., configuration card 660) instead of as individual connectors.

Figure 7:
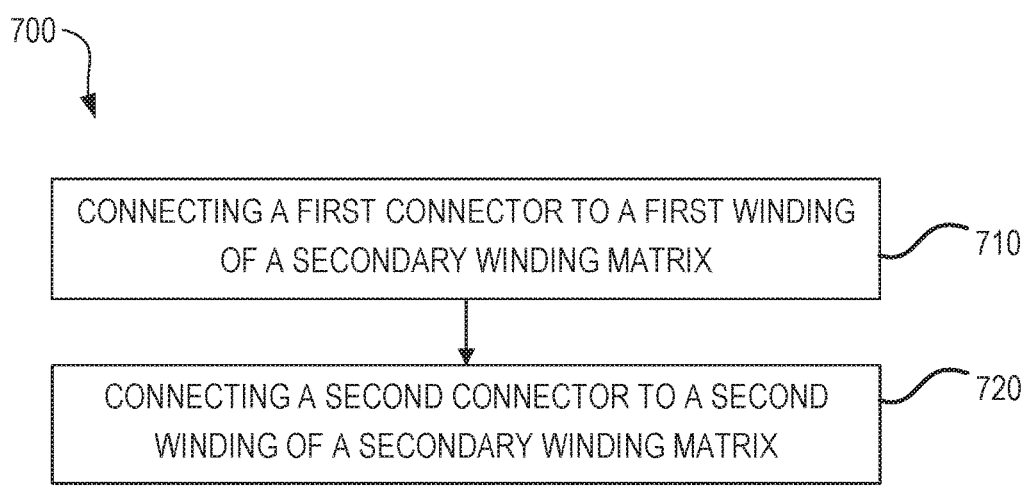
FIG. 7 illustrates a method for configuring a voltage ratio of a transformer, in accordance with various embodiments.

With reference to FIG. 7, a method 700 for configuring a voltage ratio of a transformer is provided, in accordance with various embodiments. Method 700 includes connecting a first connector to a first winding of a secondary winding matrix (step 710). Method 700 includes connecting a second connector to a second winding of a secondary winding matrix (step 720).

With combined reference to FIG. 5A and FIG. 7, step 710 may include connecting connector 522 to second surface contact 512. Step 720 may include connecting connector 523 to surface contact 514.

With combined reference to FIG. 6 and FIG. 7, step 710 may include connecting connector 662 to first winding 651 in response to configuration card 660 being connected to board edge connector 602.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A power converter, comprising:
a transformer primary winding; and
a transformer secondary winding and switching matrix, comprising:
    a plurality (n) of secondary windings; and
    a plurality (n−1)*3 of switches,
wherein the plurality of switches are configurable between open and closed positions to configure the plurality of secondary windings between series and parallel positions relative to each other to vary a voltage ratio of the power converter;
the plurality (n) of secondary windings comprises:
    a first winding coupled to a positive output terminal;

a second winding coupled to the positive output terminal via a first switch;
a third winding coupled to the positive output terminal via the first switch and a second switch; and
a fourth winding coupled to the positive output terminal via the first switch, the second switch, and a third switch; and
the plurality (n−1)*3 of switches comprises:
the first switch;
the second switch;
the third switch;
a fourth switch coupled across the first switch and the first winding;
a fifth switch coupled across the second switch and the second winding; and
a sixth switch coupled across the third switch and the third winding.

2. The power converter of claim 1, wherein the voltage ratio comprises a ratio of a transformer primary winding voltage and a transformer secondary winding and switching matrix voltage.

3. The power converter of claim 2, wherein the plurality of switches each comprises at least one of a solid state device or a relay.

4. The power converter of claim 1, wherein the plurality (n−1)*3 of switches further comprises:
a seventh switch coupled between the first winding and the second winding;
an eighth switch coupled between the second winding and the third winding; and
a ninth switch coupled between the third winding and a negative output terminal of the transformer secondary winding and switching matrix.

5. The power converter of claim 1, further comprising a controller, wherein the controller is configured to control the plurality of switches, the plurality of switches configurable between an open position and a closed position.

6. The power converter of claim 1, wherein the first winding is coupled to a positive output terminal and the second winding is coupled to a negative output terminal, the first winding is coupled to the second winding in at least one of parallel or series, and an output voltage of the transformer secondary winding and switching matrix is a voltage difference between the positive output terminal and the negative output terminal.

7. The power converter of claim 1, wherein the plurality of switches are configured for bi-directional current flow therethrough.

8. The power converter of claim 1, wherein the power converter is a bi-directional power converter.

9. A power converter, comprising:
a magnetic core;
a transformer primary winding configured to generate a magnetic field in the magnetic core; and
a transformer secondary winding matrix, comprising:
a first winding having a first number of turns; and
a second winding having a second number of turns,
wherein the first winding and the second winding are configured to transform the magnetic field in the magnetic core into an electric power, and
wherein the first winding comprises a first surface contact and a second surface contact, and
the second winding comprises a third surface contact and a fourth surface contact,
wherein the first surface contact, the second surface contact, the third surface contact, and the fourth surface contact are disposed on a board edge connector, and a configuration card is configured to connect to the board edge connector, wherein a voltage ratio of the power converter is configured in response to the configuration card being connected to the board edge connector.

10. The power converter of claim 9, wherein the power converter is configured to comprise a first voltage ratio in response to the first winding being connected in series with the second winding, via the first surface contact, second surface contact, third surface contact, and fourth surface contact; and
wherein the power converter is configured to comprise a second voltage ratio in response to the first winding being connected in parallel with the second winding, via the first surface contact, second surface contact, third surface contact, and fourth surface contact.

11. The power converter of claim 10, wherein the first voltage ratio is less than the second voltage ratio.

12. The power converter of claim 10, further comprising a plurality of connectors configured to connect to the first surface contact, second surface contact, third surface contact, and fourth surface contact, wherein the power converter is configurable between the first voltage ratio and the second voltage ratio in response to the plurality of connectors being connected to the transformer secondary winding matrix.

13. The power converter of claim 12, wherein the first winding is connected in at least one of series or parallel with the second winding, via the first surface contact, second surface contact, third surface contact, fourth surface contact, and the plurality of connectors.

14. The power converter of claim 9, wherein the configuration card comprises a plurality of connectors disposed on the configuration card, wherein the plurality of connectors contact at least one of the first surface contact, the second surface contact, the third surface contact, or the fourth surface contact in response to the configuration card being connected to the board edge connector.

15. A method for configuring a voltage conversion ratio of a transformer, comprising:
connecting a first connector to a first winding of a transformer secondary winding matrix;
connecting a second connector to a second winding of the transformer secondary winding matrix;
wherein the first winding and the second winding surround a magnetic core, the first connector is configured to receive an electric current from the first winding,
the first connector is connected to the first winding in response to a configuration card being connected to a board edge connection of the transformer, wherein the first connector is disposed on the configuration card, and
the second connector is connected to the second winding in response to the configuration card being connected to the board edge connection of the transformer, wherein the second connector is disposed on the configuration card.

16. The method of claim 15, wherein the first connector is soldered onto a first surface contact of the first winding and the second connector is soldered onto a second surface contact of the second winding.

* * * * *